UNITED STATES PATENT OFFICE.

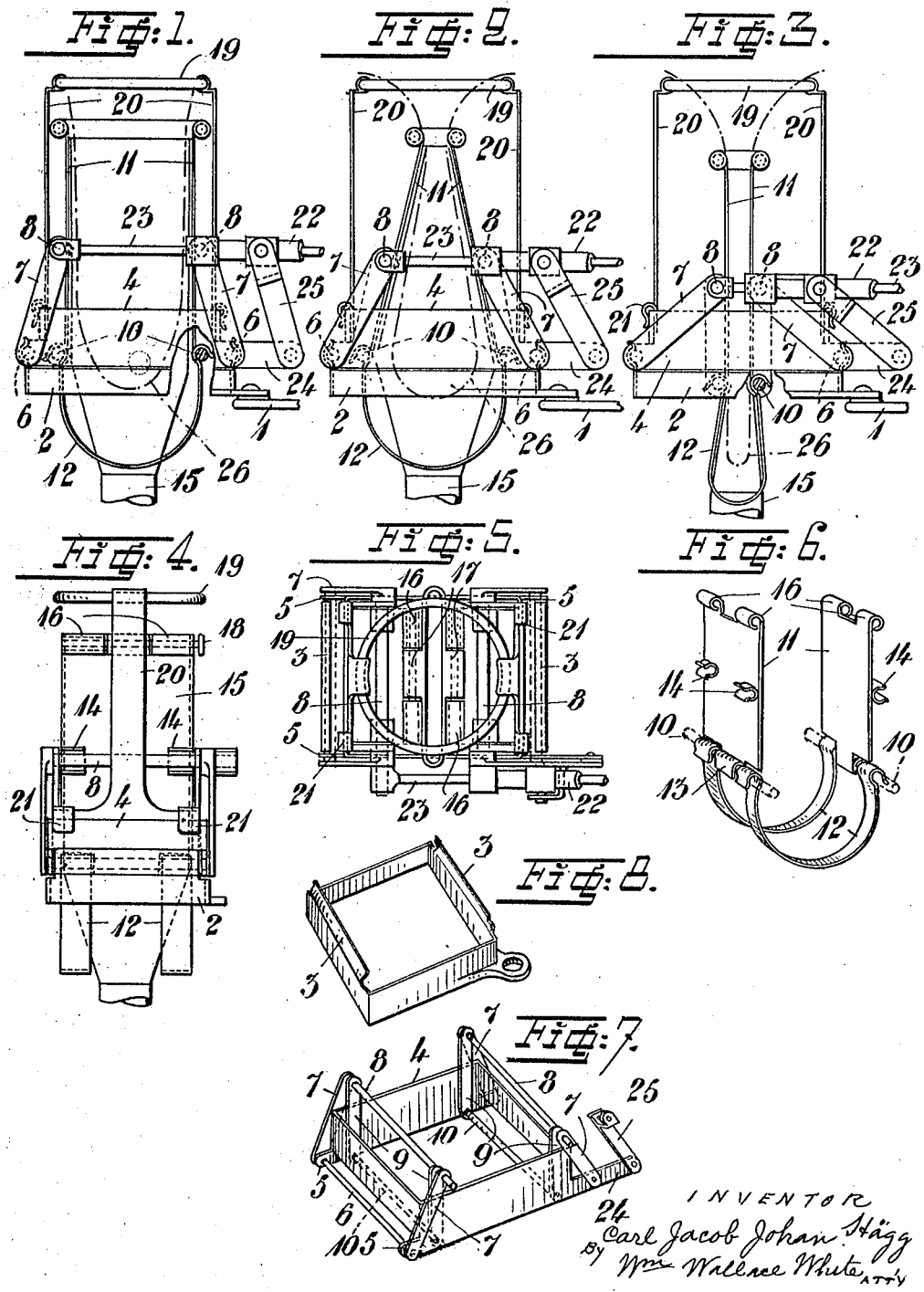

CARL JACOB JOHAN HÄGG, OF STOCKHOLM, SWEDEN.

TEAT-WORKING MECHANISM OF MILKING-MACHINES.

1,298,694.  Specification of Letters Patent.  Patented Apr. 1, 1919.

Application filed March 25, 1918. Serial No. 224,589.

*To all whom it may concern:*

Be it known that I, CARL JACOB JOHAN HÄGG, a subject of the King of Sweden, residing at Stockholm, Sweden, have invented new and useful Improvements in Teat-Working Mechanisms of Milking-Machines, of which the following is a specification.

The present invention refers to an improvement in such teat working mechanisms of milking machines in which the teats are worked between two plates, movable to and from each other, in such a way that the upper part of the plates first shuts off the milk in the teats whereupon the other part of the plates closes and squeezes out the milk from the teats. The characteristics of the improvement consist in that each plate, which is pivoted between its upper and lower end on a member movable to and from the teat and tending by means of spring power to maintain its lower end at a distance from the teat against the action of a driving device operating the said member, rests in its outer position by the action of a spring device freely upon a stationary shoulder placed by the side of the teat below the member in such a way, that, at the beginning of the movement of the member toward the teat, the plate turns on the said shoulder until the upper end of the plate exercises a pressure sufficient to close the teat root, besides which the said spring power is so adjusted that, upon the last named pressure reaching such degree, the driving device overcomes the spring power so that the plate, during the further movement of the movable member, turns on the teat root and successively places itself upon the teat along the whole length of the latter, accompanied by a continuous increase of the spring power and, at the same time, owing to the pivotal arrangement of the plate upon the member, by a consequent increase of the closing power at the teat root. By this means there is gained, in addition to the fact that only one common driving device will be needed for shutting off the milk in the teat from the udder and for squeezing out the milk from the teat, also the fact that a permanent adjusting device regulating the closing pressure at the teat root will become superfluous and that the machine will be self-adjusting, not only for various teat thickness of the same udder, but also for different cows, so that the same machine can, without further adjustment, be employed for milking different cows. It is evident that this will mean an essential simplification of the milking machine and a more advantageous working of the same.

In the annexed drawing a constructional form of an improvement according to the present invention is illustrated as an example only. Figures 1, 2 and 3 are a side elevation of a teat working mechanism, the teat working members being shown in three different positions. Fig. 4 is a rear elevation of the improvement shown in Fig. 1. Fig. 5 is a plan view of Fig. 2. Figs. 6, 7 and 8 are a perspective view of some details.

Each teat-working mechanism is carried by an arm 1 by means of a rectangular frame 2 provided with two opposite, upward-extending flanges 3 which are yielding and corrugated. Another rectangular frame 4 has a shaft 6 outside each of two opposite sides of the same, journaled in ears 5 on the frame. The frame 4 is kept on the frame 2 by the shafts 6 being engaged in the corrugated flanges 3, and the end edges of these latter rest on the ears 5. On the ends of the shafts 6 extending through the ears 5 there are secured upward-extending arms 7 which at the top are connected two and two by means of shafts 8, the said shafts 8 going freely through two arms 9 extending downward in the frame 4 near the arms 7, the lower ends of the arms 9 being connected by a rod 10. 11 are two teat-working plates and 12 two springs. The plates 11 form at their lower edges spring-holders 13, by means of which they catch the shaft 10, so that they are pivoted on the same. Almost half-way between the upper and lower end the plates 11 are provided with spring-holders 14 by means of which they engage in the shaft 8 so that they are pivoted on the same. The springs 12 at their upper ends are likewise formed like elastic-holders by means of which they engage in the shaft 10 so that they are pivoted on the same. The plates 11 shown are themselves unyielding and are, besides, stiffened by means of the parts 9 and 10. The frame 4 forms shoulders on which, in consequence of the action of the springs 12, the lower end of the plates 11 freely rest in the positions of the plates 11 shown in Figs. 1 and 2. A cot 15 of indiarubber for the teat 26 is, at the top, hinged to the plates 11, for which purpose these latter and the cot are shown provided with edges bent to the form of sleeves 16 and 17, the sleeves 17 of the cot entering into a space between the sleeves 16 of the plates and a pin 18 being introduced into the said sleeves. The cot extends downward between the springs 12. A guide-ring 19 for the teats is carried above the plates 11 by two uprights 20 which are pivoted on the said ring and which are provided below with holders 21, by means of which they are fixed on the frame 4. For driving the teat-working plates there is employed a flexible pipe 22 and a string 23 introduced into the same, the said pipe and string being movable in relation to each other. The string 23 is connected with one end of one shaft 8 and the pipe 22 with one end of the other shaft 8, so that the driving device of the plates 11 will operate them centrally as regards the height direction. One of the springs 12 can be left out and only that one be retained which is arranged on that side where the said string and pipe are attached. In order that the plates 11 may have a similar movement and meet half way, a link square is arranged which is formed by the pipe 22, a projection 24 on frame 4, the adjacent arm 7 and a link 25 between the pipe 22 and the projection 24, which said link 25 is parallel to the arm 7.

The improvement shown and described works as follows:

When a pull is exerted on the string 23 and pressure is applied to the pipe 22 by means of a suitable driving device, the upper parts of the plates 11 are first brought together from the position shown in Fig. 1 to the position shown in Fig. 2 and squeeze the teat at the teat root and shut off the milk in the teat from the udder, while, at the same time the plates 11 at the lower ends rest and turn on the frame 4. During the continued moving of the plates to the position shown in Fig. 3, the plates at their upper end will rest and turn on the teat root and successively approach each other from above downward, at the same increasing the tension of the spring 12 and squeezing out the milk from the teat. But in consequence of the plates 11 being pivoted on the shafts 8, the increased tension of the springs 12 will work more and more powerfully in closing the upper parts of the plates 11 at the teat root, so that this closing at the teat root will be effective during the entire milking movement of the plates 11, and will be greater than at other points of the teat provided that the springs 12 are of sufficient strength. Special members with adjusting devices for closing the plates 11 are thus made superfluous. The effective closing pressure at the teat root will not be reached until the resistance at the teat root operates the resistance of the springs. By this it is clear that a thick as well as a thin teat always will get the same pressure at the teat root, and it is just this that is aimed at because by this means the injurious action of the compression of teats of various thickness is avoided. It is also seen that the closing pressure at the teat root will be greater according as the teat is successively compressed in its longitudinal direction, so that, when the milk is compressed in the teat in order to open the teat muscles, this milk will not return into the udder.

By some parts of the improvement being held fast by means of spring-holders they can be easily removed for cleaning. Of course, the springs 12 can be replaced by some other spring device which tends to move the lower parts of the plates 11 apart from each other and to facilitate the above-named action for closing the teat at the teat-root with the power required, independently of the driving device of the plates. In addition, the details of the improvement can vary as regards size, material, number, form and composition and they can also be reversed provided that the characteristic features of the invention be retained.

What I claim is:

1. A milking machine comprising a pair of removable teat-engaging members capable of occupying one extreme position wherein they are in parallelism, an intermediate position wherein they are disposed in convergent relation, and another extreme position which is determined by the shape of the teat and means for successively actuating said members to the three different positions.

2. A milking machine comprising a pair of teat-engaging members capable of occupying two extreme positions and an intermediate position, means for biasing said members to one of their extreme positions, and means for moving said members to the other positions against said means.

3. A milking machine comprising a pair of teat-engaging members biased to predetermined positions and pivotally mounted for swinging movement in opposite direction against their bias, and means for actuating said members simultaneously.

4. A milking machine comprising a pair of teat-engaging members pivotally mounted at a plurality of points and biased to predetermined positions, and mechanism for actuating said members against their bias to first grip the root of a teat and to then successively compress the teat from its root to the outer end thereof.

5. A milking machine comprising a pair of teat-engaging members pivotally mounted at a plurality of points and biased to predetermined positions, and mechanism for actuating said members against their bias to first grip the root of a teat and to then successively compress the teat from its root to the outer end thereof, and to simultaneously increase the grip of the members on the root.

6. A milking machine comprising a pair of teat-engaging members pivotally mounted at a plurality of points and biased to predetermined positions, and mechanism for actuating said members against their bias to first grip the root of a teat, to successively compress the teat from its root to the outer end thereof, and to simultaneously increase the grip of the members on the root.

7. A milking machine comprising a pair of vertically disposed plates pivotally mounted at their lower ends and intermediate their ends, biasing means engaging the lower ends of said plates for biasing the same away from each other, and means engageable with certain of the pivot points for actuating said plates to first occupy convergent positions relatively and to then move the same inwardly to occupy the extreme position close by the teat.

8. A milking machine comprising a pair of movable members biased outwardly to predetermined positions, and means for first moving said members inwardly but not against their bias and then further inwardly and downwardly against their bias.

9. A milking machine comprising movable members, and means for actuating said members to cause the upper ends thereof to grip the root of a teat, to then compress the teat longitudinally toward its outer end, and to simultaneously increase the gripping action of the members at the root of a teat.

In testimony whereof I have signed my name to this specification in the presence of two subscribing witnesses.

CARL JACOB JOHAN HÄGG.

Witnesses:
J. F. A. RUTHACK,
E. MOBERG.

Copies of this patent may be obtained for five cents each, by addressing the "Commissioner of Patents, Washington, D. C."